May 7, 1963 G. J. DANIS 3,088,308
SPARK TESTING STANDARD
Filed Nov. 9, 1959
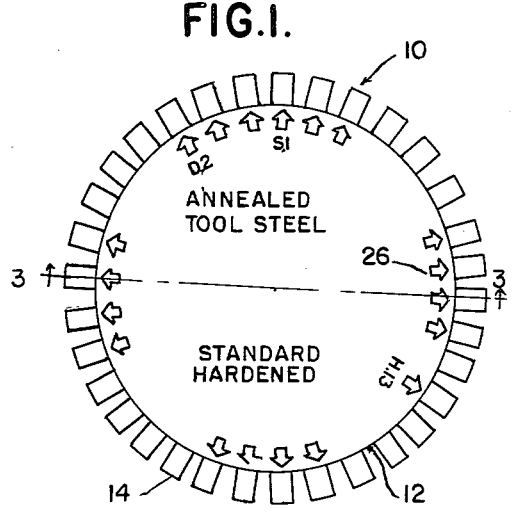
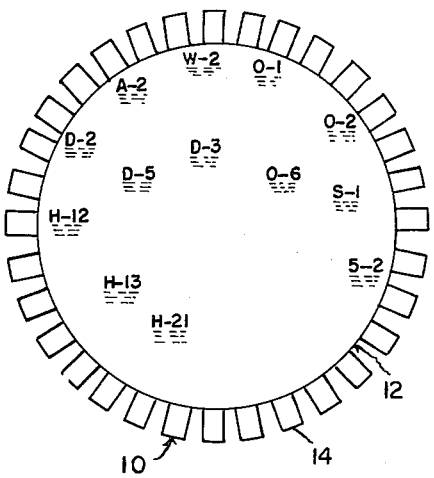
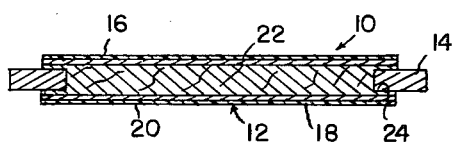
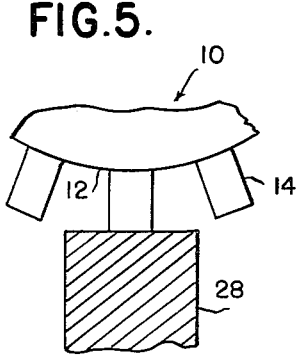
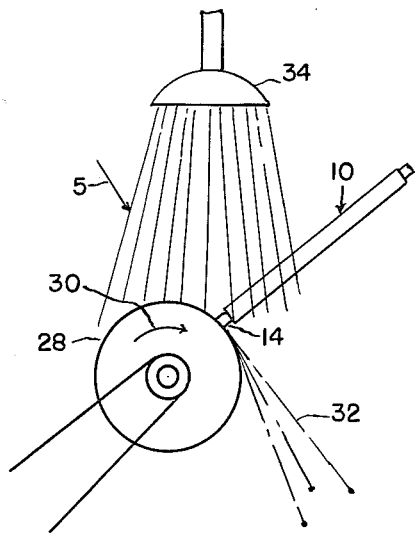
INVENTOR.
GEORGE J. DANIS
ATTORNEYS 3,088,308
Patented May 7, 1963

3,088,308
SPARK TESTING STANDARD
George J. Danis, Roseville, Mich., assignor to GLD
Products Company, Roseville, Mich., a co-partnership
Filed Nov. 9, 1959, Ser. No. 851,674
1 Claim. (Cl. 73—7)

The present invention relates to spark testing of steels and refers more particularly to a spark testing standard comprising a circular disc having a plurality of steel studs of different composition extending radially from the periphery thereof.

Spark testing is an established method of quickly identifying steels of unknown composition. In spark testing, samples of steel having an unknown composition are held against a high speed grinding wheel whereby sparks are produced. The sparks are then compared with the sparks produced by similarly placing samples of steels of known composition against the grinding wheel. Since steels of different composition produce differently appearing sparks when held against a grinding wheel, when the sparks of a sample stud of steel of a known composition appear identical with that of the sample of the steel of unknown composition being tested it will be understood that the composition of the steel being tested is the same as that of the sample stud. Thus through the use of spark testing it is no longer necessary to discard a perfectly good piece of steel because the identification has been removed therefrom and other methods of determining the composition of the steel such as chemical analysis are cost prohibitive.

In the past it has been practice to keep loose samples of steel of known composition for performing the above indicated spark test. The loose samples are often scattered about a shop however and even when a complete series thereof may be found they are difficult to hold against a grinder individually in a manner to produce the most desirable sparks. Furthermore the mark on the individual samples indicating the steel composition thereof may be destroyed rendering the samples useless. Also in the past it has been practice to secure a number of the sample studs to a chain member which may be kept in the vicinity of a grinder for testing purposes. However with most such devices it is still difficult to hold the individual sample studs against the grinder and usually these devices require the removal of the sample studs from the chain before the testing process.

Therefore it is the purpose of the present invention to provide a spark testing standard wherein sample steel studs of different composition are held in a rigid construction in a position to be individually placed against a grinder wheel for producing sparks characteristic of the particular steel composition of the individual sample studs.

Another purpose is to provide a spark testing standard wherein sample steel studs of different composition are secured in the periphery of a rigid plate which is adapted to act as a light shield when the steel studs are placed against a grinder wheel to facilitate viewing of sparks produced thereby.

Another purpose is to provide a spark testing standard wherein radially extending sample steel studs of different composition are secured in spaced relation along the arcuate periphery of a rigid plate in a position to be individually placed against a grinder wheel for producing sparks characteristic of the particular steel composition of the individual sample studs.

More specifically it is the purpose of the present invention to provide a spark testing standard wherein a plurality of radially extending sample steel studs of different known compositions are attached in spaced relation to each other around the periphery of a circular wooden disc in a position to be individually placed against a grinder wheel for producing sparks characteristic of the particular steel composition of the individual studs, said disc having on one face thereof adjacent each stud a common indication of the steel composition of the stud and having on the other face thereof the trade-names and other designations of the particular studs.

A further purpose is to provide a spark testing standard, which is simple in construction, economical to manufacture, and efficient in use.

Other objects and features of the invention will become apparent as the description proceeds, especially when taken in conjunction with the accompanying drawings, illustrating a preferred embodiment of the invention, wherein:

FIGURE 1 is a plan view of the spark testing standard according to the invention illustrating one side thereof.

FIGURE 2 is a plan view of the spark testing standard of FIGURE 1 illustrating the other side thereof.

FIGURE 3 is a section view of the spark testing standard of FIGURE 1 taken on the line 3—3 in FIGURE 1.

FIGURE 4 is a somewhat diagrammatic representation of a spark testing standard according to the invention in use and particularly illustrating the light shielding feature of the invention.

FIGURE 5 is a partial view of the grinder wheel and spark testing standard illustrated in FIGURE 4 taken in the direction of the arrow 5 in FIGURE 4 and illustrating the engagement of the grinder wheel with one of the sample studs of the spark testing standard.

With reference to the figures a particular embodiment of the spark testing standard of the invention will now be described.

As shown in FIGURE 1 the spark testing standard generally indicated 10 comprises a circular disc 12 having radially extending sample studs of steel 14 of a known composition inserted around the periphery thereof in spaced relation. Identification discs 16 and 18 are provided on the opposite sides of disc 12 for ready identification of the particular type of steel of which the individual studs 14 are composed and for determining the trade or other common names of each type of steel. The identification discs are encased in plastic 20 to protect the identification marks thereon and to provide for easy cleaning of said discs.

In use as shown best in FIGURE 4 the spark testing standard is held in the position shown with one of the sample studs against a grinding wheel to produce sparks which are then compared with sparks of a sample of steel of unknown composition. When the sparks produced by one of the sample studs of known composition on the spark testing standard appears to be the same as that of the steel sample of unknown composition being tested the composition of the steel of the unknown sample is then known since like steel compositions produce like sparks. As shown in FIGURE 4 the disc serves to provide means for holding the sample studs against the grinder and to shield the sparks from light so that they may be better observed. The particular circular construction of applicant's spark testing standard permits the engagement of the grinder wheel with a single sample stud without the danger of engaging the sample studs adjacent thereto as shown in FIGURE 5.

The circular disc 12 as illustrated in FIGURES 1, 2 and 3 comprises a central section 22 of birch wood or similar material having radially extending recesses 24 spaced around the outer edge thereof. The recesses 24 are adapted to receive the individual sample studs 14 therein. Identification discs 16 and 18 are secured to the opposite surfaces of the central section 22 of the circular disc 12 by means of a contact cement providing one hundred percent adherence between the identification discs and the central portion 22 of the circular disc 12.

The identification disc 16 as illustrated in FIGURES 1 and 3 is a circular sheet of relatively stiff index paper adapted to be fully cemented to the central portion 22 of the circular disc 12 as previously mentioned. Printed on the outer surface of the identification disc 16 opposite each of the sample studs 14 are common identification means for indicating the particular composition of the sample stud associated therewith, such as the designations S1, D2 and H13 shown in FIGURE 1 in conjunction with means such as arrows 26 to designate the sample stud to which the indication refers. As shown in FIGURE 1 further identification means may be printed on the identification disc 20 to indicate broad classifications of steel such as annealed steel or standard hardened steel.

The identification disc 18 is similar to identification disc 20 in that it is made of the same material and is cemented to the central portion 22 of the circular disc 12 as illustrated in FIGURE 3. The circular disc 18 has printed thereon the designations of the particular sample studs indicated on the identification disc 16 followed by the trade names and other common designations of each of the individual steel compositions indicated on the identification disc 16.

Both of the discs 16 and 18 are secured to the central portion 22 of the circular disc 12 by means of a contact cement having one hundred percent adherence. A coat of lacquer is then applied to the discs and they are then sealed by means of a layer of clear plastic such as polyester resin. Thus the information printed on the identification discs is protected from defacement due to normal use of the spark testing standard and cleaning thereof is facilitated.

The individual sample studs 14 as illustrated best in FIGURE 3 may be one-half inch round steel studs one and one-fourth inches long for example when a disc 12 having a seven and one-half inch diameter and three-fourth inch depth is used in conjunction therewith. As previously indicated the steel studs 14 are adapted to be received in the recesses 24 in the periphery of the central portion 22 of the circular disc 12. Suitable means such as an adhesive are provided to retain the studs 14 in the recesses 24. The studs 14 as shown in FIGURES 1 and 2 are each of a different composition of commonly used steel. The discs may be made to incorporate a set of sample studs for any commercially manufactured steels. For example sets of test studs may be made for different alloy steels, stainless steels and tool steels as will be well understood by those familiar with the various classifications of steels and the individual steel compositions within the various classifications thereof. The sample studs are of course replaceable in the spark testing standard as they become worn through years of use.

As shown best in FIGURE 4 the spark testing standard 10 illustrated in FIGURES 1–3 may be positioned radially with respect to a high speed grinding wheel 28 which is rotating in direction of arrow 30 with one of the sample studs 14 thereon in contact therewith to produce sparks indicated at 32. The sparks may then be observed and compared with the sparks produced from a sample of a steel of which it is desired to know the composition which is also held against the grinder wheel 28. When the sparks produced are identical the sample of unknown composition will be determined to be of the same composition as that of the particular sample stud 14 on the spark testing standard used to produce the similar sparks.

With reference to FIGURE 4 it will be noted that by holding the spark testing standard 10 in the manner indicated the disc 12 shields the sparks from the glare of lighting indicated at 34, thus facilitating the observation of the sparks produced by grinding of the sample studs. Furthermore it will be noted as shown in FIGURE 5 that due to the arcuate nature of the periphery of the circular disc 12 that it is very unlikely that more than one of the sample studs will be contacted by the grinder wheel 28 during a test. Also due to the circular nature of the spark testing standard and the radial insertion of the sample studs 14 therein it is possible to place a maximum of sample studs around the periphery of a given disc 12 without interference of the inner ends thereof which would take place at corners on a differently shaped disc.

While a particular embodiment of the invention has been disclosed above it will be understood by those skilled in the art that many modifications thereof are possible. It is applicant's intention to include within the scope of his invention all such modifications as may readily suggest themselves. For example one contemplated modification is the production of half circular spark testing standards by constructing full discs as disclosed above having identification discs thereon the two halves of which are identical, and then cutting the full discs along a diameter thereof to produce two identical half discs.

The drawings and the foregoing specification constitute a description of the improved spark testing standard in such full, clear, concise and exact terms as to enable any person skilled in the art to practice the invention, the scope of which is indicated by the appended claim.

What I claim as my invention is:

Spark testing apparatus for producing sparks in conjunction with a grinding wheel representative of materials of known chemical composition for comparison with sparks produced from material of unknown chemical composition whereby the composition of said material of unknown composition may be determined by comparison of said sparks comprising a substantially flat, continuous, circular opaque disc, a plurality of radially extending separate sample studs of steel of different known chemical compositions secured around the periphery of the body member in spaced relation to each other, the radial extent of the sample studs being small relative to the diameter of the disc, and means positioned on the circular disc immediately adjacent the sample studs for identifying the chemical composition of each separate stud.

References Cited in the file of this patent
UNITED STATES PATENTS

| | | |
|---|---|---|
| 2,483,882 | Cooper | Oct. 4, 1949 |
| 2,541,974 | Wills | Feb. 13, 1951 |
| 2,901,829 | Lucas | Sept. 11, 1959 |

FOREIGN PATENTS

| | | |
|---|---|---|
| 351,350 | Great Britain | June 25, 1931 |